Feb. 21, 1956 C. A. HINKAL 2,735,210
WEED GUARD
Filed Aug. 19, 1953

United States Patent Office 2,735,210
Patented Feb. 21, 1956

2,735,210

WEED GUARD

Charles A. Hinkal, Williamsport, Pa.

Application August 19, 1953, Serial No. 375,123

2 Claims. (Cl. 43—43.6)

This invention relates to weed guards for fish hooks and has for an object the provision of a weed guard, readily applicable to and removable from the fish hook, of relatively low cost, but highly efficient and effective in operation.

In many streams and lakes plant life, submerged trees and rocky bottoms present obstacles making it relatively impossible to use plugs with multiple hooks attached thereto because of the frequency with which they become attached to stationary objects or become tangled with such plant life, hereinafter generically referred to as weeds.

There have been many proposals in the past to attach spring elements to the hooks having a spring arm extending outwardly over the point of the hook to prevent such hook from picking up weeds as well as its impalement or engagement with branches, stumps and rocks. While such weed guards have functioned effectively, there is still need for weed guards which can be readily applied to and removed from the hook so that they may be dispensed with during fishing in relatively open water, and yet which may be quickly and conveniently made available when the more hazardous waters are to be fished.

In carrying out the present invention in one form thereof, there is provided a weed guard having an eye arranged to fit around the shank of the hook, the weed guard then passing through the eye of the hook and extending outwardly and downwardly with an eye at the end disposed over the barb of the hook and providing shielding against engagement of the point of the hook with weeds and stationary objects. Weed guards constructed and used in accordance with the present invention are applicable to single hooks or gang hooks, whether used singly or in multiple, as on plugs and the like.

For a more complete understanding of the invention and for further objects and advantages thereof, reference is to be had to the following description taken in conjunction with the accompanying drawings, in which.

Figure 1:
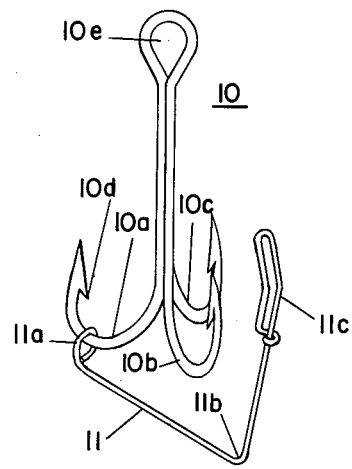
Fig. 1 illustrates the first step in applying a weed guard embodying the present invention to a fish hook.

Referring to Fig. 1, the invention has been shown in one form as applied to a fish hook 10a forming a part of a triple hook 10, to the other two hooks 10b and 10c of which weed guards may also be applied in the same manner, as will be explained for the hook 10a. The weed guard 11 itself is preferably made of rust-resistant wire which may be of spring steel, a beryllium alloy, or other elastic and spring-like material. At one end there is provided an eye 11a formed by bending the wire in the form of a loop disposed at an angle of about 90° to the longitudinal axis of the wire. It may be circular or with straight-sided bends, the only important consideration being that it will be of sufficient internal diameter as to freely pass over the barb 10d of hook 10a. The eye 11a is preferably disposed at a substantial angle to the more or less straight middle portion of the guard 11, and the opposite end portion is likewise bent at 11b from the straight-sided portion terminating in a relatively long loop forming a long opening or eye 11c.

After the eye 11a is slipped over the end of the hook 10a, the opposite end including the eye 11c is moved upwardly and threaded through the opening 10e of the hook, it being noted that the sharp bend 11b is made at a position along the length of the weed guard so that a straight length thereof will lie relatively closely against the shank of the hook.

Figure 2:
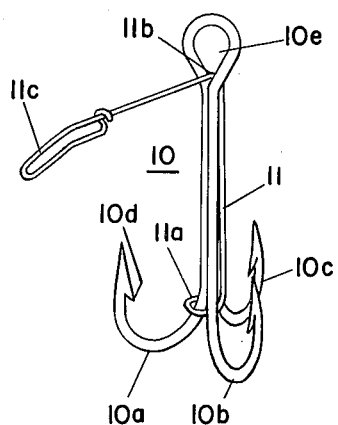
Fig. 2 illustrates the second step in applying such weed guard.
Figure 3:
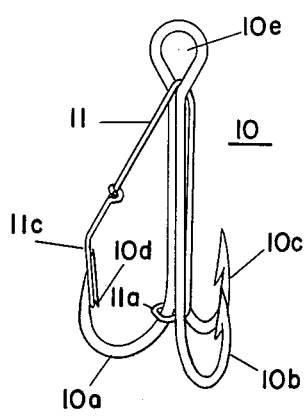
Fig. 3 illustrates the weed guard in its operative position on a fish hook.

To complete the assembly of the weed guard on the hook 10a it is only necessary that the outwardly extending end, as shown in Fig. 2, be moved inwardly against the natural elasticity of the weed guard to a position where the eye 11c fits over the barb 10d where it is held in place by the spring force and also by reason of its disposition behind and under the barb 10d.

It will be observed that the sides of the loop or eye 11c extend, from the crotch between the barb 10d and the shank 10a of the hook, outwardly covering the point of the hook to prevent its engagement with any obstacle against which it may be drawn. Thus an obtuse angle is formed between the sides forming the eye or loop 11c and the straight portion of the guard extending downwardly from the eye 10e of the hook. However, a fish being attracted to the lure of which the hook forms a part, strikes against the weed guard 11 immediately exposing the sharp end of the hook to impale the fish thereon displacing the eye 11c from the barb.

Where the weed guard is to be applied to a single hook, it will be understood that the length of the weed guard 11 will then be such that the eye 11a, instead of being located as in Fig. 2 at the crotch formed by the meeting of the triple hook, will be located adjacent the eye 10e of the hook 10a, the extending portion of the weed guard being the same dimensions as shown in Fig. 2. The diameter of the wire forming the weed guard will be selected so that it will nest under the barb 10d and yet can and will be sprung toward the shank by exertion of pressure as when a fish closes down on the hook. Only weed guards of two or three wire sizes will be needed to cover a wide selection of hook-sizes.

Figure 4:
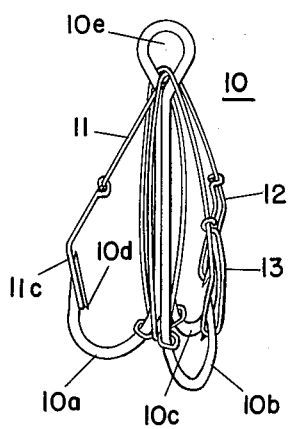
Fig. 4 illustrates three removable weed guards as applied to a hook of the triple type.

Having explained the manner in which the weed guard is constructed, and the various steps performed in applying it to a hook, it will be understood that it may be removed therefrom by simply reversing the steps previously described. It will be further understood that weed guards may be simultaneously applied to double hooks or to triple hooks, or an assembly of them, the guards 11, 12 and 13 being illustrated in assembled position in Fig. 4 on the triple hook 10.

It is to be further understood that modifications of the invention may be made within the scope of the appended claims.

What is claimed is:

1. In combination with a fish hook of the multiple type having an eye on a shank and a plurality of barbed hooks, the hooks forming crotches at the lower end of the shank, a weed guard for each barbed hook, each guard comprising a wire formed into a loop at one end said loop being threaded over the barbed end of one of said hooks and pulled into engagement with said crotch, a portion of the remainder of said wire extending through the eye of the hook and having an end portion movable into a position behind and in locking engagement with the barb of the hook over which the loop of the wire has been threaded, each of said weed guards being made of spring wire for the development of a spring force for holding the extended end portion in position behind the barb, said extended portion being shaped to overlie the point of each hook.

2. A weed guard for a fish hook of the barbed type having an eye on the shank and a crotch along the shank, comprising a spring wire of a length approximately equal to the shortest distances between said crotch and said eye and between said eye and the reentrant portion of the barbed hook, said spring wire having a first loop at one end of size adapted to be threaded over the barbed end of the hook and to be pulled into engagement with said crotch, a portion of the remainder of said wire extending through the eye of the hook and having at the opposite end portion a second loop of a size threadable through the eye of the hook and movable into a position behind and in locking engagement with the barb of the hook, said spring wire being anchored at one end by said crotch and bendable at the eye of the hook for development of a spring force upon movement of said second loop behind said barb for holding in place the portion of the wire extending from the first loop to said barb, said second loop being shaped to overlie the point of the hook when in position behind said barb.

References Cited in the file of this patent

UNITED STATES PATENTS

| | | |
|---|---|---|
| 745,221 | Miller | Nov. 24, 1903 |
| 863,078 | Merz | Aug. 13, 1907 |
| 1,713,122 | Gorman | May 14, 1929 |
| 1,766,279 | Brown | June 24, 1930 |
| 1,929,150 | Peckinpaugh | Oct. 3, 1933 |
| 2,090,571 | Coffin | Aug. 17, 1937 |
| 2,255,222 | Leusch | Sept. 9, 1941 |
| 2,503,573 | Allen | Apr. 11, 1950 |
| 2,506,883 | Mattieson | May 9, 1950 |
| 2,586,162 | Hayden | Feb. 19, 1952 |
| 2,615,277 | Hayden | Oct. 28, 1952 |